(12) United States Patent
Waeschke et al.

(10) Patent No.: US 8,828,623 B2
(45) Date of Patent: Sep. 9, 2014

(54) CONTACT ELEMENT FOR AN ELECTRICALLY CONDUCTIVE CONNECTION BETWEEN AN ANODE AND AN INTERCONNECTOR OF A HIGH-TEMPERATURE FUEL CELL

(75) Inventors: Ulf Waeschke, Dresden (DE); Mihails Kusnezoff, Dresden (DE)

(73) Assignee: Plansee SE, Reutte (AT)

( * ) Notice: Subject to any disclaimer, the term of this patent is extended or adjusted under 35 U.S.C. 154(b) by 206 days.

(21) Appl. No.: 13/256,715

(22) PCT Filed: Feb. 26, 2010

(86) PCT No.: PCT/DE2010/000236
§ 371 (c)(1),
(2), (4) Date: Nov. 23, 2011

(87) PCT Pub. No.: WO2010/108466
PCT Pub. Date: Sep. 30, 2010

(65) Prior Publication Data
US 2012/0135336 A1    May 31, 2012

(30) Foreign Application Priority Data
Mar. 26, 2009   (DE) .......................... 10 2009 015 794

(51) Int. Cl.
*H01M 8/02* (2006.01)
*H01M 8/12* (2006.01)

(52) U.S. Cl.
CPC .......... *H01M 8/0232* (2013.01); *H01M 8/0245* (2013.01); *Y02E 60/50* (2013.01); *Y02E 60/525* (2013.01); *H01M 2008/1293* (2013.01)
USPC ......................................... 429/518; 429/522

(58) Field of Classification Search
CPC .. H01M 8/023; H01M 8/0245; H01M 8/0232
USPC ......................................... 429/518, 517, 522
See application file for complete search history.

(56) References Cited

U.S. PATENT DOCUMENTS

| 6,632,554 B2 | 10/2003 | Doshi et al. | |
| 2002/0094465 A1* | 7/2002 | Fleck et al. | 429/32 |

(Continued)

FOREIGN PATENT DOCUMENTS

| CN | 1520623 A | 8/2004 |
| CN | 101195894 A1 | 6/2008 |

(Continued)

OTHER PUBLICATIONS

International Preliminary Report on Patentability and Written Opinion for corresponding PCT Application PCT/DE2010/000236, dated Oct. 11, 2011.

(Continued)

*Primary Examiner* — Gregg Cantelmo
(74) *Attorney, Agent, or Firm* — Matthew B. Dernier, Esq.; Gibson & Dernier LLP

(57) ABSTRACT

The invention relates to a contact element for an electrically conductive connection between an anode and an interconnector of a high-temperature fuel cell. It is the object of the invention to achieve a more reliable electrically conductive connection with long-term stability between an anode and the associated interconnector of a high-temperature fuel cell. The contact element in accordance with the invention is arranged between an anode and an interconnector of a high-temperature fuel cell. It is formed with two areal electrically conductive part elements. In this respect, one respective part element is in touching contact with the anode and the other part element is in touching contact with the respective interconnector. Openings are formed in the part elements and the part elements are formed from materials having mutually different coefficients of thermal expansion.

11 Claims, 2 Drawing Sheets

(56) References Cited

U.S. PATENT DOCUMENTS

| | | |
|---|---|---|
| 2002/0177031 A1 | 11/2002 | Doshi |
| 2006/0024547 A1 | 2/2006 | Waldbillig |
| 2007/0003819 A1 | 1/2007 | Zhang |

FOREIGN PATENT DOCUMENTS

| | | | |
|---|---|---|---|
| DE | 10232093 A1 | | 2/2004 |
| JP | 10092446 A | * | 4/1998 |
| JP | 2002231276 A | | 8/2002 |
| JP | 2002260706 A | | 9/2002 |
| JP | 2006528405 A | | 12/2006 |
| WO | WO2005008816 A2 | | 1/2005 |
| WO | 2005122300 A2 | | 12/2005 |
| WO | 2006082057 A2 | | 8/2006 |

OTHER PUBLICATIONS

International Search Report for corresponding PCT Application PCT/DE2010/000236, dated Jun. 24, 2010.

Office Action for corresponding JP Application 2012501128, dated Aug. 28, 2013.

Office Action for corresponding CN Application 201080013337.6, dated Jul. 1, 2013.

* cited by examiner

CONTACT ELEMENT FOR AN ELECTRICALLY CONDUCTIVE CONNECTION BETWEEN AN ANODE AND AN INTERCONNECTOR OF A HIGH-TEMPERATURE FUEL CELL

BACKGROUND

The invention relates to a contact element for an electrically conductive connection between an anode and an interconnector of a high-temperature fuel cell. With high-temperature fuel cells, it is customary to combine individual fuel cells to stacks and to connect them to one another in an electrically conductive manner in so doing. For this purpose, interconnectors, which are also called bipolar plates, are arranged between the electrodes of individual fuel cells. The electric current can thus flow from one electrode of a fuel cell to the oppositely poled electrode of the proximate fuel cell.

Since it is, however, necessary that fuel or oxidizing agent can move to the electrodes, a permeability or porosity is required for this purpose, which influences the electrical conductivity.

Differently configured current collectors have thus previously been used between the electrodes and the respectively arranged interconnectors. Examples for this are networks or current collectors which are formed with fibers (DE 102 32 093 A1).

A further problem which generally has to be taken into account with high-temperature fuel cells is the thermal expansion, due to the high operating temperature of the fuel cells. For this reason, as a rule the materials for all essential individual elements of the fuel cell, that is the material for the electrodes and the interconnectors, and in part also the materials of the current collectors, are selected such that the coefficient of thermal expansion of the solid electrolyte is taken into account. Only small deviations should be permitted in this respect.

The current collectors which provide the electrically conductive connection between an anode and an interconnector associated therewith are made from nickel as a rule. However, nickel has a much greater coefficient of thermal expansion. On the cooling down of a high-temperature fuel cell from the operating temperature to the room temperature, a length deficit is formed in the anode contacting. This has the result that a ceramic contacting of the cathode is subject to tensile strains and the contact can tear off there. Electrical losses thereby occur and the achievable power is reduced.

A reduction in the thickness of such an electrically conductive connection formed with nickel in this manner between the anode and the interconnector is also not expedient since mechanical strains and production tolerances must also be compensated by the ductility of the nickel.

On a formation of the contact between the anode and the interconnector using nets or fiber structures, a locally differentiated deformation also occurs during the operation of fuel cells which has the result that spots having increased electrical conductivity occur which are called "hot spots". The larger part of the electric current flows there.

If it occurs in this process that the contact is disturbed at these positions, it necessarily results that the electrical conductivity is reduced and the electrical resistance is increased. This has a particularly disadvantageous effect on the restarting of a previously deenergized fuel cell since no such contact is present at a current collector formed in this manner at least during this time via which a large electric current can flow locally restricted in this manner between the anode and the interconnector.

SUMMARY OF THE INVENTION

It is therefore the object of the invention to achieve a more reliable electrically conductive connection with long-term stability between an anode and the associated interconnector of a high-temperature fuel cell.

In accordance with one or more embodiments of the invention, this object is achieved by a contact element having one or more of the features disclosed and described herein. Advantageous embodiments and further developments of the invention can be achieved using technical features also disclosed and described herein.

A contact element in accordance with the invention is formed with two areal electrically conductive part elements. In this respect, one respective part element is in touching contact with the anode and the other part element is in touching contact with the respective interconnector. Openings are formed in the part elements via which the fuel can pass through the contact element and the contact element is permeable for this purpose. Both part elements are formed from materials each having mutually different coefficients of thermal expansion.

The part elements, and thus also the total contact element, can also be porous.

A contact element can also be formed from more than two part elements. The coefficients of thermal expansion are to be taken into account in an analog manner in this process.

Deformations occur on a temperature change due to the different coefficients of thermal expansion. Electrically conductive contacts can thereby be stabilized by compressive strains induced in the contact element. They are distributed over the surface of the contact element. Electric current can thereby flow distributed correspondingly more locally over the available surface between the anode and the interconnector.

On the deformation, peaks and troughs can be formed at the contact element which are arranged distributed over the surface. Troughs preferably occur at positions of openings in this respect. On a cooling down from the operating temperature of a high-temperature fuel cell, the deformation of the contact element which occurs can thus be utilized in that regions are pressed toward the anode and regions are pressed toward the interconnector by the deformation. The electrical contact can thereby be improved.

This effect can be utilized again in every further temperature change.

The coefficients of thermal expansion of the materials from which the two part elements are formed should be so far apart that the difference in the expansion amounts to at least 1 ppm/K. This should be maintained at least in the temperature range between 700° C. and the operating temperature of high-temperature fuel cells.

The openings formed in the part elements should be arranged so that the contact element is permeable for fuel and the respective openings at one part element communicate with a respective opening of the other part element.

It can be taken into account on the selection of the materials for the part elements and on their dimensioning that the two part elements are of equal size or can be of equal size at a temperature which is at least 100 K lower than the operating temperature of the high-temperature fuel cell.

The part elements can advantageously be dimensioned with respect to the shape and the size of their surface that their outer margins contact a peripherally formed marginal element at a temperature which is at least 100 K lower than the operating temperature of the high-temperature fuel cell. This can, however, already be the case at room temperature.

The outer margins of the part elements of the contact element can, however, also be fixed alone or in addition to the previously made indications peripherally with a marginal element and/or the part elements can at least be connected to one another at their outer margins.

The deformation advantageously usable with the invention can be achieved over the surface of the contact element on temperature changes by these measures.

The contact element in accordance with the invention should be flexibly deformable and permeable for gas; the part elements can be formed by flexibly deformable, perforated films for this purpose.

The part elements can in this respect each be formed from a different metal, or from an alloy thereof, which is selected from Ni, Cu, Fe and Co.

The total thickness of a contact element should amount to a maximum of 2 mm.

The two part elements of a contact element in accordance with the invention can have different thicknesses. In this respect, the respective coefficient of thermal expansion, the mechanical properties (e.g. the ductility) and also the respective electrical conductivity can be taken into account.

The openings of the part elements should make up 20 to 90%, preferably 40 to 60%, of the surface of the anode surface and/or of the interconnector surface to ensure that a sufficient fuel exchange can take place and the electrical conductivity can be kept high.

The openings should be arranged regularly and equidistant with respect to one another and each be of the same dimension and contour, with this applying at least to the central region. The outer margin can optionally be different therefrom or wholly free of openings.

A part element having the larger coefficient of thermal expansion should be arranged at the side of the contact element facing the anode and the part element having the smaller coefficient of thermal expansion should be arranged at the side of the contact element facing the interconnector.

The invention will be explained in more detail by way of example in the following.

There are shown:

DETAILED DESCRIPTION OF THE INVENTION

Figure 1:
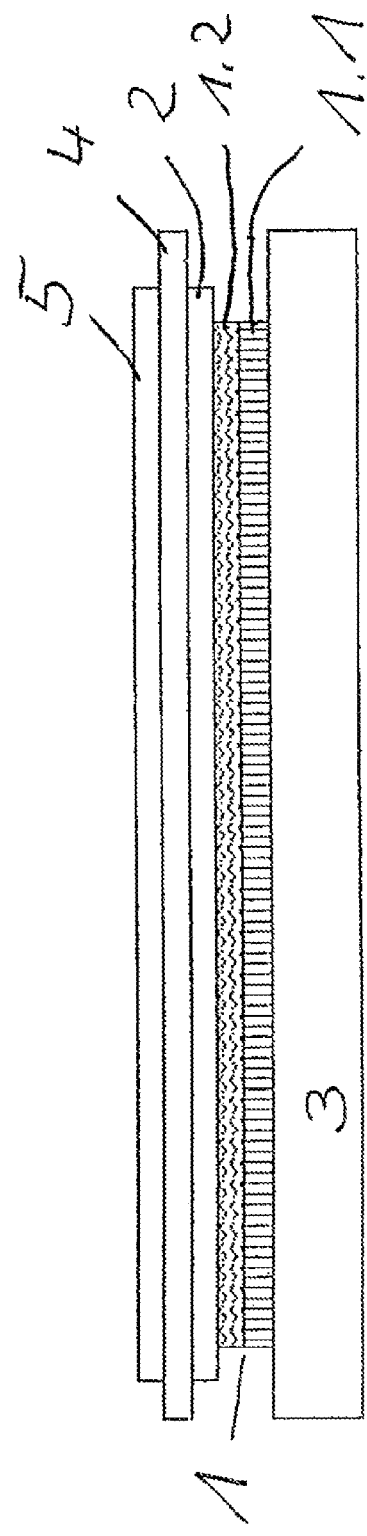
FIG. 1 is a sectional representation through a high-temperature fuel cell with a contact element in accordance with the invention.
Figure 2:
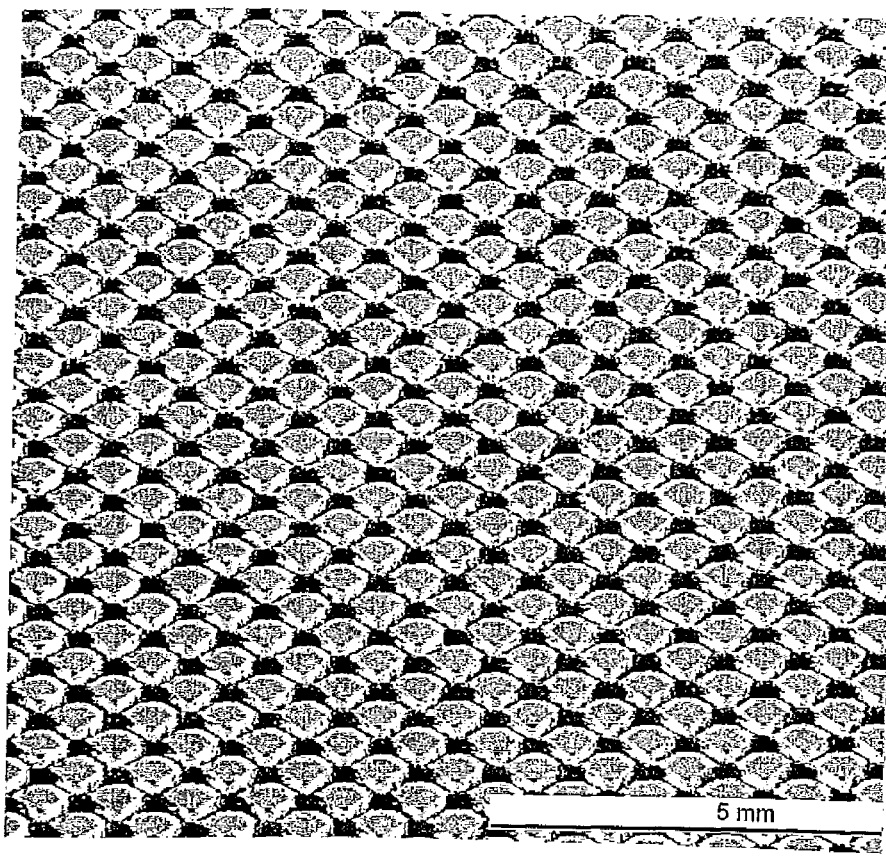
FIG. 2 is a view of a part element of an example of a contact element in accordance with the invention.

A high-temperature fuel cell is shown in section in FIG. 1. In this respect, a contact element 1 on an interconnector 3 is arranged between it and the anode 2. The solid electrolyte 4 and a cathode 5 are arranged above the anode 2.

The contact element 1 is here formed with two films as the two part elements 1.1 and 1.2. In this respect, the part element 1.1 arranged at the interconnector side is formed from pure copper ($\alpha=16.5*10^{-3}$ $K^{-1}$ at 20° C.) and it has a thickness of 290 μm. The second part element 1.2 arranged at the anode side is formed with a 120 μm thick film of pure nickel ($\alpha=13.0*10^{-3}$ $K^{-1}$ at 20° C.)

The invention claimed is:

1. A contact element for an electrically conductive connection between an anode and an interconnector of a high-temperature fuel cell, said contact element being arranged between the anode and an interconnector, wherein:
the contact element is formed with first and second areal electrically conductive part elements, the first areal electrically conductive part element is in touching contact with the anode and the second areal electrically conductive part element is in touching contact with the respective interconnector;
openings are formed in the first and second areal electrically conductive part elements such that the fuel passes through the contact element; and
the first and second areal electrically conductive part elements are formed from respective materials having mutually different coefficients of thermal expansion; and
the first and second areal electrically conductive part elements are formed from respective metals selected from the group consisting of Ni, Cu, Fe, Co, and alloys thereof.

2. A contact element in accordance with claim 1, wherein the openings formed in the first and second areal electrically conductive part elements are arranged so that the contact element is permeable for fuel.

3. A contact element in accordance with claim 1, wherein the first and second areal electrically conductive part elements are of equal size at a temperature which is at least 100 K lower than the operating temperature of the high-temperature fuel cell.

4. A contact element in accordance with claim 1, wherein outer margins of the respective first and second areal electrically conductive part elements contact a peripherally formed marginal element at a temperature which is at least 100 K lower than the operating temperature of the high-temperature fuel cell.

5. A contact element in accordance with claim 1, wherein outer margins of the respective first and second areal electrically conductive part elements of the contact elements are at least connected to one another at their outer margins.

6. A contact element in accordance with claim 1, wherein the contact element is flexibly deformable.

7. A contact element in accordance with claim 1, wherein the first and second areal electrically conductive part elements are flexibly deformable, perforated films.

8. A contact element in accordance with claim 1, wherein the first and second areal electrically conductive part elements have different thicknesses.

9. A contact element in accordance with claim 1, wherein the openings of the first and second areal electrically conductive part elements make up 20 to 90% of at least one of: a surface of the anode, and a surface of the interconnector.

10. A contact element in accordance with claim 1, wherein the openings are arranged regularly and equidistant to one another and each have the same dimensions and contours.

11. A contact element in accordance with claim 1, wherein the first areal electrically conductive part element arranged at the anode side has a larger coefficient of thermal expansion than the second areal electrically conductive part element arranged at a side facing the interconnector.

* * * * *